(12) United States Patent
Akahane et al.

(10) Patent No.: US 8,854,035 B2
(45) Date of Patent: Oct. 7, 2014

(54) MAGNETIC TYPE ROTATION DETECTION DEVICE AND ITS MANUFACTURING METHOD

(75) Inventors: Takehiko Akahane, Nagano (JP); Tomomi Akahane, legal representative, Nagano (JP); Haruhiro Tsuneta, Nagano (JP); Keiji Osada, Nagano (JP); Syungo Yasaki, Nagano (JP)

(73) Assignee: Nidec Sankyo Corporation (JP)

( * ) Notice: Subject to any disclaimer, the term of this patent is extended or adjusted under 35 U.S.C. 154(b) by 659 days.

(21) Appl. No.: 13/062,547

(22) PCT Filed: Sep. 2, 2009

(86) PCT No.: PCT/JP2009/004330
§ 371 (c)(1),
(2), (4) Date: May 18, 2011

(87) PCT Pub. No.: WO2010/026752
PCT Pub. Date: Mar. 11, 2010

(65) Prior Publication Data
US 2011/0227563 A1      Sep. 22, 2011

(30) Foreign Application Priority Data

Sep. 5, 2008  (JP) ................................ 2008-228001
Aug. 19, 2009  (JP) ................................ 2009-189963

(51) Int. Cl.
*G01D 5/14* (2006.01)
*G01B 7/30* (2006.01)

(52) U.S. Cl.
CPC . *G01D 5/145* (2013.01); *G01B 7/30* (2013.01)
USPC .......................... 324/207.25; 324/246; 29/428

(58) Field of Classification Search
CPC .................................. G01D 5/145; G01B 7/30
USPC .......... 324/207.11, 207.22, 207.25, 244, 246, 324/249, 252, 260–262, 160, 163, 173–175
See application file for complete search history.

(56) References Cited

U.S. PATENT DOCUMENTS 6,201,388 B1 *  3/2001  Pecheny et al. ............ 324/207.2
6,407,543 B1 *  6/2002  Hagio et al. ............. 324/207.25

(Continued)

FOREIGN PATENT DOCUMENTS

| JP | 2004053499 A | * | 2/2004 | ............. G01R 33/02 |
| JP | 2005-348555 A | | 12/2005 | |
| JP | 2006214871 A | * | 8/2006 | |
| JP | 2008-151774 A | | 7/2008 | |
| JP | 2008-185557 A | | 8/2008 | |
| WO | 2008/062778 A1 | | 5/2008 | |
| WO | WO 2009028407 A1 | * | 3/2009 | ............... G01D 5/14 |

OTHER PUBLICATIONS

International Search Report for International Application No. PCT/JP2009/004330 mailed Nov. 10, 2009 with English translation.

*Primary Examiner* — Huy Q Phan
*Assistant Examiner* — James Split
(74) *Attorney, Agent, or Firm* — Cantor Colburn LLP

(57) ABSTRACT

A magnetic type rotation detection device may include a magnet body formed with a magnetic pole pair comprised of an "S"-pole and an "N"-pole and provided on a rotation body, a magnetic sensing element facing the magnet body in a rotation center axial line direction of the rotation body, a partition member disposed between the magnet body and the magnetic sensing element, and a ring fixed to a face of the partition member on a side where the magnet body is located. A center of the magnetic sensing element may be located on a center axial line of the ring. The magnet body may be disposed on an inner side of the ring in a non-contact state with the ring. A center of the magnet body may be located on the center axial line of the ring.

14 Claims, 11 Drawing Sheets

(56) References Cited

U.S. PATENT DOCUMENTS

| | | |
|---|---|---|
| 6,555,748 B1 * | 4/2003 | Gul ................................. 174/59 |
| 6,919,558 B2 * | 7/2005 | Feneis et al. ............. 250/231.13 |
| 7,042,212 B2 * | 5/2006 | Yoshikawa et al. ...... 324/207.25 |
| 7,208,943 B2 * | 4/2007 | Godoy et al. ............ 324/207.25 |
| 7,352,174 B1 * | 4/2008 | Lee .......................... 324/207.25 |
| 2007/0151322 A1 * | 7/2007 | Steinich ........................ 73/1.75 |
| 2008/0218158 A1 * | 9/2008 | Carlson et al. ............. 324/207.2 |
| 2009/0009159 A1 * | 1/2009 | Patil et al. ................ 324/207.25 |
| 2009/0206827 A1 | 8/2009 | Aimuta et al. |
| 2011/0296698 A1 * | 12/2011 | Busse-Grawitz et al. ...... 33/1 PT |

\* cited by examiner

Sectional View A-A'

MAGNETIC TYPE ROTATION DETECTION DEVICE AND ITS MANUFACTURING METHOD

CROSS REFERENCE TO RELATED APPLICATIONS

This is a U.S. national stage of international application No. PCT/JP2009/004330, filed on Sep. 2, 2009. Priority under 35 U.S.C. §119(a) and 35 U.S.C. §365(b) is claimed from Japanese Applications Nos. 2008-228001, filed Sep. 5, 2008, and 2009-189963, filed Aug. 19, 2009; the disclosures of each of which are also incorporated herein by reference.

TECHNICAL FIELD

The present invention relates to a magnetic type rotation detection device and its manufacturing method for detecting an angular position or a rotating speed of a rotation body.

BACKGROUND

A non-contact type rotation detection device includes an optical type and a magnetic type, and a magnetic type rotation detection device is advantageous in that it can be used under an environment where a large amount of dust and moisture exist or in a liquid in comparison with an optical type rotation detection device. In other words, a magnetic type rotation detection device is commonly provided with a magnet body, which is formed with a magnetic pole pair comprised of an "S"-pole and an "N"-pole, and a magnetic sensing element which detects an angular position or a rotating speed when the magnet body is rotated and, even when dust or moisture adheres to the magnet body, sensitivity is not lowered. In the magnetic type rotation detection device, for example, a plurality of magnetic pole pairs comprised of an "S"-pole and an "N"-pole is formed on an outer peripheral face of the magnet body, and a magnetic sensing element is disposed at a position facing the outer peripheral face of the magnet body (see Patent Literature 1).

[PTL 1] Japanese Patent Laid-Open No. 2008-151774

In the magnetic type rotation detection device as described above, a high degree of positional accuracy is required between the magnet body and the magnetic sensing element. Therefore, conventionally, various workings are performed in an apparatus on which the magnetic type rotation detection device is mounted, and the magnet body and the magnetic sensing element are positioned to each other with the above-mentioned workings and thus considerable labor is required in the workings.

In view of the problem described above, at least an embodiment of the present invention provides a magnetic type rotation detection device and its manufacturing method in which the magnet body and the magnetic sensing element are aligned with each other with a high degree of accuracy without workings requiring considerable labor.

SUMMARY

In order to attain the above, at least an embodiment the present invention provides a magnetic type rotation detection device including a magnet body which is formed with a magnetic pole pair comprised of an "S"-pole and an "N"-pole and which is provided on a rotation body, a magnetic sensing element which faces the magnet body in a rotation center axial line direction of the rotation body, a partition member which is disposed between the magnet body and the magnetic sensing element, and a ring which is fixed to a face of the partition member on a side where the magnet body is located. A center of the magnetic sensing element is located on a center axial line of the ring, and the magnet body is disposed on an inner side of the ring in a non-contact state with the ring, and a center of the magnet body is located on the center axial line of the ring.

According to at least an embodiment the present invention, the partition member is disposed between the magnet body and the magnetic sensing element and the positions of the magnetic sensing element and the magnet body are adjusted with the ring fixed to the partition member as a reference. Therefore, the magnetic sensing element and the magnet body are disposed with the ring as a reference with a high degree of positional accuracy.

In at least an embodiment the present invention, it is preferable that the magnet body is formed with one pair of the "S"-pole and the "N"-pole. In other words, in at least an embodiment the present invention, the number of magnetic pole pair which is formed in the magnet body is reduced and, instead, resolution is secured by means of that arithmetic processing is performed such that, for example, interpolation processing is performed on a signal provided from the magnetic sensing element to obtain zero crossing points. According to this structure, the magnetic pole pair formed in the magnet body is reduced to the minimum, i.e., one pair and thus, even when the magnet body and the magnetic sensing element are separated from each other in some degree, sufficient sensitivity is obtained. Therefore, the partition member can be provided between the magnet body and the magnetic sensing element and the ring is fixed to the partition member. The magnetic sensing element is protected from dust and moisture by the partition member.

In at least an embodiment the present invention, it is preferable that the magnetic sensing element is disposed in a recessed part of the partition member which is recessed toward the side where the magnet body is located. There is limitation to reduce thickness of the entire partition member. However, in a case that a recessed part is provided in the partition member and the magnetic sensing element is disposed in the inside of the recessed part, even when the partition member is disposed between the magnetic sensing element and the magnet body, the magnetic sensing element and the magnet body can be approached to each other.

In at least an embodiment the present invention, it is preferable that the magnetic sensing element is mounted on a circuit board, the circuit board is disposed so as to overlap with a circuit board support part which is formed around the recessed part of the partition member, and a gap space is formed between the magnetic sensing element and the bottom part of the recessed part. The magnetic sensing element is weak to stress but, according to this structure, the magnetic sensing element is disposed on the bottom part of the recessed part in a non-contact state. Therefore, even when the magnetic sensing element and the magnet body are approached to each other, a stress is not applied to the magnetic sensing element and thus the magnetic sensing element with a high degree of sensitivity is attained.

In at least an embodiment the present invention, it is preferable that the magnetic sensing element is positioned by the recessed part so that an outer peripheral end part of the magnetic sensing element is abutted with an inner peripheral side face of the recessed part. According to this structure, positional accuracy between the magnetic sensing element and the recessed part is improved. As a result, in a case that, after the partition member and the magnet body have been aligned with each other with the ring as a reference, the magnetic sensing element is fixed to the partition member or, in a case that, after the magnetic sensing element and the magnet body have been aligned with each other with the ring as a reference, the magnetic sensing element is fixed to the partition member, in both of the cases, positional accuracy between the magnetic sensing element and the magnet body is improved.

In at least an embodiment the present invention, a structure may be adopted that the magnetic sensing element is provided with a protective layer on its surface, and an outer peripheral end part of the protective layer is abutted with the inner peripheral side face of the recessed part. According to this structure, even when the outer peripheral end part of the magnetic sensing element is abutted with the inner peripheral side face of recessed part, an unnecessary stress is not applied to the magnetic sensing element.

In at least an embodiment the present invention, it is preferable that the recessed part is provided with a bottom part and four inner peripheral side faces, two side parts of outer peripheral end parts of the protective layer which are adjacent to each other in a circumferential direction are abutted with two inner peripheral side faces adjacent to each other of the four inner peripheral side faces, and the magnetic sensing element is positioned by the two inner peripheral side faces of the recessed part. In a case that the recessed part is provided with four inner peripheral side faces, when the outer peripheral end part of the protective layer is to be abutted with the four inner peripheral side faces, a high degree of dimensional accuracy is required between the recessed part and the protective layer. Therefore, in a case that a dimensional error has occurred, for example, when a shape of the protective layer is larger, the magnetic sensing element may be disposed in the recessed part in an inclined state or, when the protective layer is smaller, the magnetic sensing element is unable to be positioned. However, according to at least an embodiment the present invention, the outer peripheral end part of the protective layer is abutted with only two inner peripheral side faces adjacent to each other. Therefore, even when a high degree of dimensional accuracy is not secured between the recessed part and the protective layer, positioning in an in-plane direction of the magnetic sensing element can be performed.

In at least an embodiment the present invention, it is preferable that the recessed part is provided with a first recessed part having a large diameter and a second recessed part which is recessed at a substantially center position of a bottom part of the first recessed part, and the outer peripheral end part of the protective layer is abutted with the inner peripheral side faces of the second recessed part so that the magnetic sensing element is positioned by the second recessed part.

In at least an embodiment the present invention, it is preferable that the partition member is formed with an annular groove which surrounds the recessed part on a face where the magnet body is located, and an end part of the ring on a side where the magnetic sensing element is located is fitted into the annular groove. According to this structure, the ring is surely fixed to a predetermined position of the partition member.

In at least an embodiment the present invention, it is preferable that the ring is a magnetic shielding member which is made of magnetic material. According to this structure, even when a special shielding member is not used, magnetic shielding is performed by the ring which is used for positioning.

In at least an embodiment the present invention, it is preferable that a spacer is further provided which is fixed to a stationary body side of an apparatus on which the magnetic type rotation detection device is mounted. The spacer is provided with a through hole in which the magnet body is disposed on an inner side, and an inner diameter dimension of the through hole is the same as an outer diameter dimension of the ring, and the ring is fitted into the through hole so that the ring is located between an inner wall of the through hole and an outer peripheral face of the magnet body. According to this structure, the magnetic sensing element is disposed at a predetermined position on the stationary body.

In order to attain the above, at least an embodiment present invention provides a manufacturing method for a magnetic type rotation detection device having a magnet body which is formed with a magnetic pole pair comprised of an "S"-pole and an "N"-pole and which is provided on a rotation body, and a magnetic sensing element which faces the magnet body in a rotation center axial line direction of the rotation body. The manufacturing method includes; fixing a ring on a face of a partition member, which is disposed between the magnet body and the magnetic sensing element, on a side where the magnet body is located; performing a first alignment step in which alignment of the ring with the magnetic sensing element is performed so that a center of the magnetic sensing element is located on a center axial line of the ring and then the magnetic sensing element is fixed to the partition member; and after the first alignment step, performing a second alignment step in which the ring and the magnet body are aligned with each other so that a center of the magnet body is located on the center axial line of the ring.

According to at least an embodiment the present invention, the partition member is disposed between the magnet body and the magnetic sensing element and the positions of the magnetic sensing element and the magnet body are adjusted with the ring fixed to the partition member as a reference. Therefore, the magnetic sensing element and the magnet body are disposed with a high degree of positional accuracy with the ring as a reference.

In at least an embodiment the present invention, it is preferable that a recessed part is previously provided in the partition member so that the recessed part is recessed toward a side where the magnet body is located and is provided with an inner peripheral side face with which an outer peripheral end part of the magnetic sensing element is abutted and, in the first alignment step, when the magnetic sensing element is to be fixed to the partition member, the outer peripheral end part of the magnetic sensing element is abutted with the inner peripheral side face of the recessed part so that the magnetic sensing element is positioned. According to this method, positional accuracy between the magnetic sensing element and the recessed part is improved. As a result, positional accuracy between the magnetic sensing element and the magnet body is improved in a case that the magnetic sensing element and the magnet body are aligned with each other with the ring as a reference.

Even in the case of the structure described above, it is preferable that a gap space is formed between the magnetic sensing element and a bottom part of the recessed part in a state that the magnetic sensing element is fixed to the partition member. According to this structure, the magnetic sensing element is disposed on the bottom part of the recessed part in a non-contact state and thus an unnecessary stress is not applied to the magnetic sensing element.

In at least an embodiment the present invention, it is preferable that the second alignment step includes: a first operation in which a spacer provided with a through hole having an inner diameter dimension that is the same as an outer diameter dimension of the ring is disposed so that the magnet body is located in an inside of the through hole; a second operation in which a tube part of a jig is inserted between an inner wall of the through hole and an outer peripheral face of the magnet body to align the spacer with the magnet body through the jig; a third operation in which the spacer is fixed to a stationary body of an apparatus on which the magnetic type rotation detection device is mounted and then the jig is detached; and a fourth operation in which the ring is fitted into the through hole so that the ring is located between the inner wall of the through hole and the outer peripheral face of the magnet body. According to this method, the magnetic sensing element and the magnet body are easily disposed with a high degree of positional accuracy with the ring as a reference.

According to at least an embodiment the present invention, the partition member is disposed between the magnet body and the magnetic sensing element and the positions of the magnetic sensing element and the magnet body are adjusted with the ring fixed to the partition member as a reference. Therefore, the magnetic sensing element and the magnet body are disposed with a high degree of positional accuracy with the ring as a reference.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF PREFERRED EMBODIMENTS

A magnetic type rotation detection device and its manufacturing method will be described below with reference to the accompanying drawings.

First Embodiment

Entire Structure of Magnetic Type Rotation Detection Device

Figure 1A:
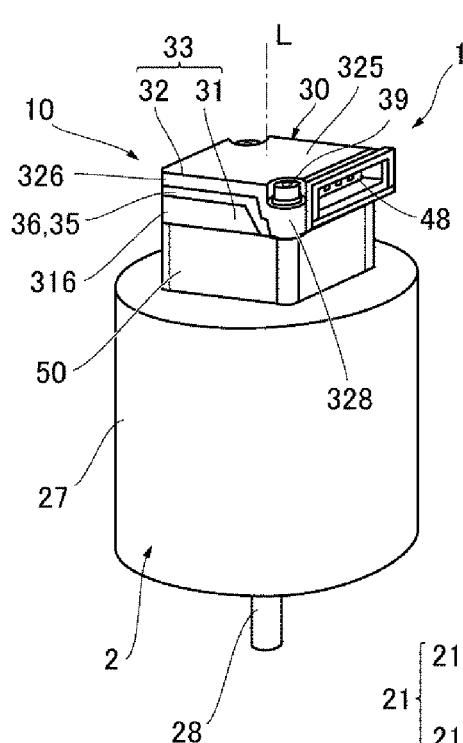
FIG. 1(a) is an outward appearance view showing a magnetic type rotation detection device in accordance with a first embodiment of the present invention and FIG. 1(b) is its exploded perspective view.
Figure 1B:
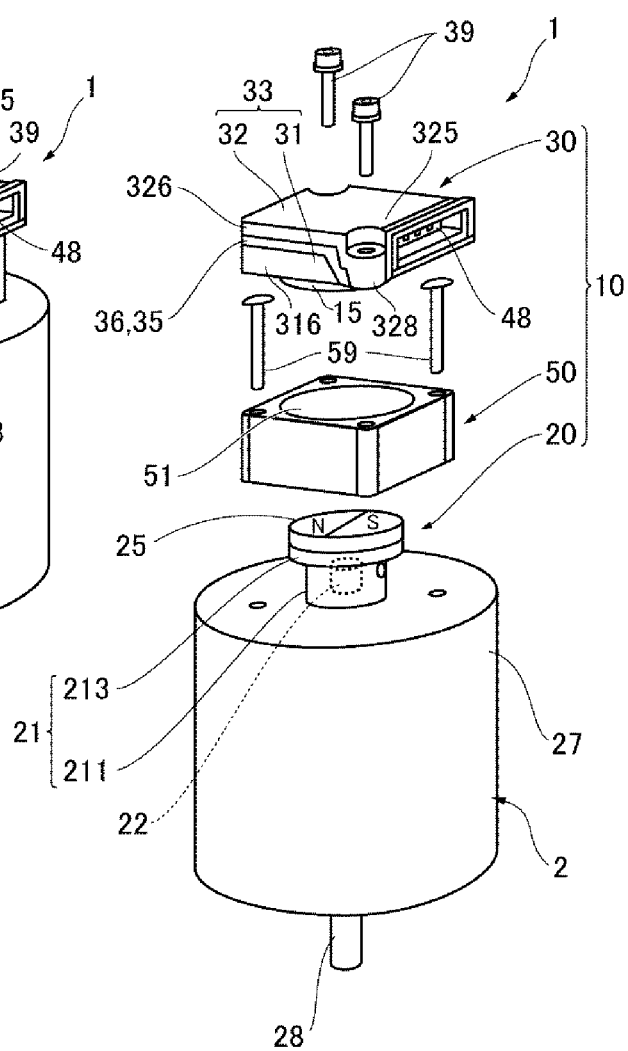
Figure 2A:
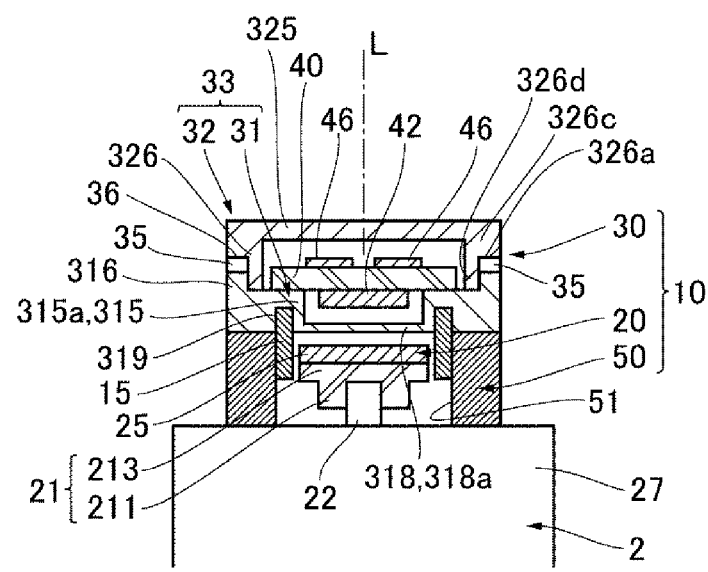
FIG. 2(a) is a cross-sectional view schematically showing a structure of a part of the magnetic type rotation detection device in accordance with the first embodiment of the present invention and FIG. 2(b) is an explanatory view showing its detection principle.
Figure 2B:
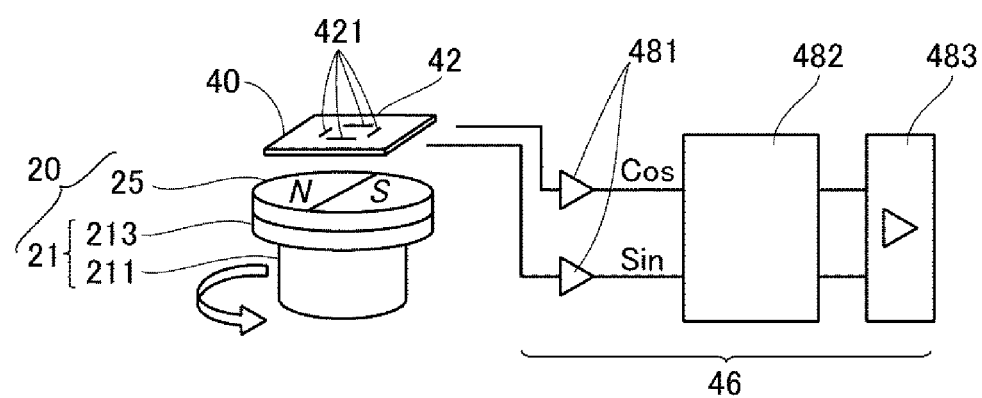
Figure 3A:
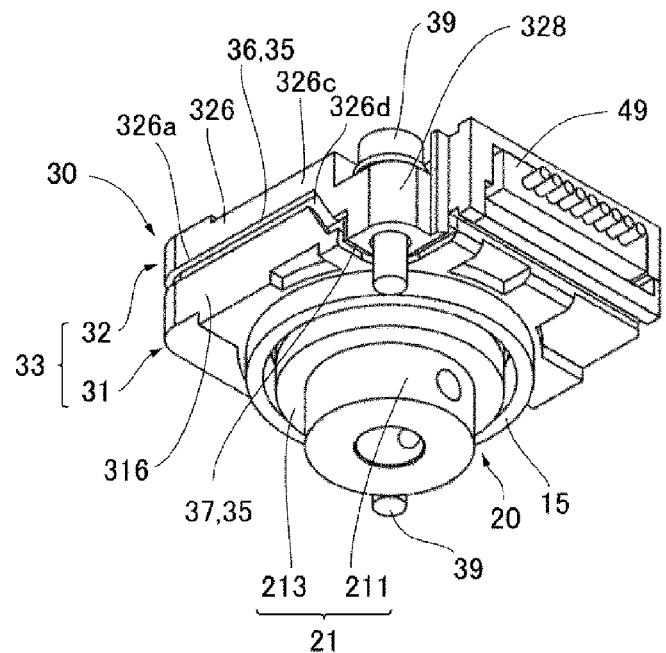
FIG. 3(a) is a perspective view showing a part of the magnetic type rotation detection device in accordance with the first embodiment of the present invention and FIG. 3(b) is a perspective view showing a state where a magnet body and a circuit unit are separated from each other.
Figure 3B:
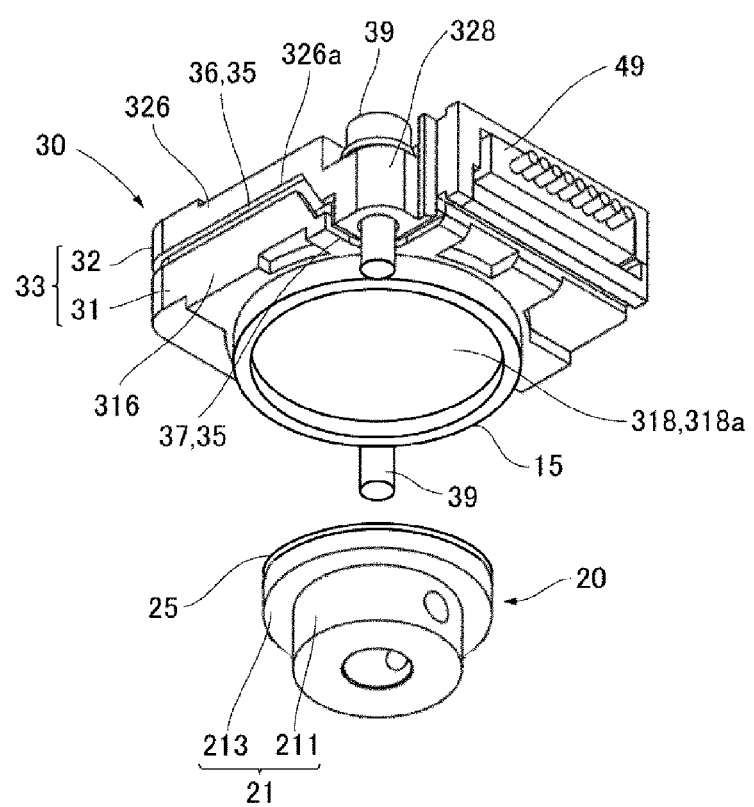
Figure 4:
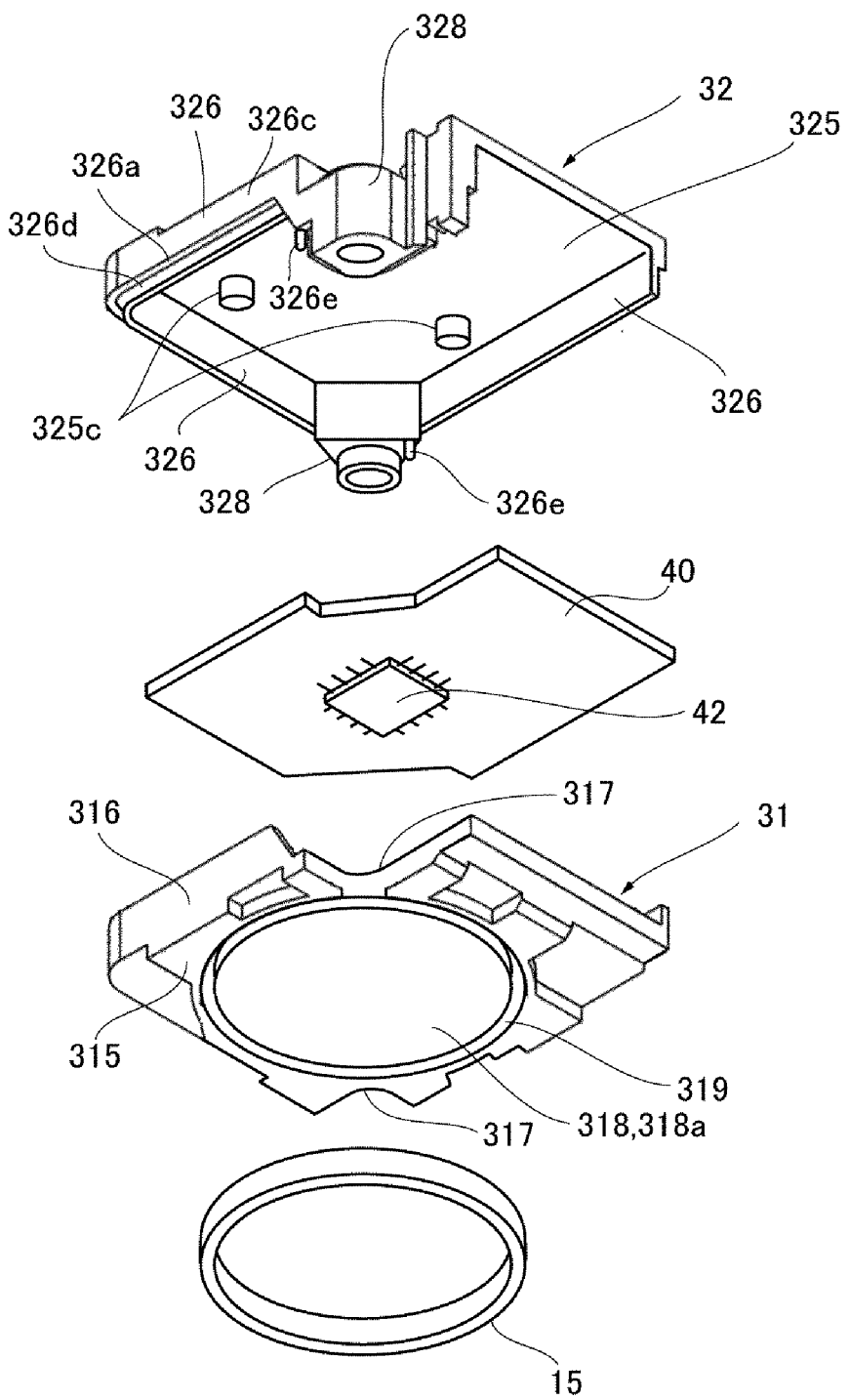
FIG. 4 is an explanatory view showing a disassembled circuit unit of the magnetic type rotation detection device in accordance with the first embodiment of the present invention which is viewed from a side of a first case body.
Figure 5:
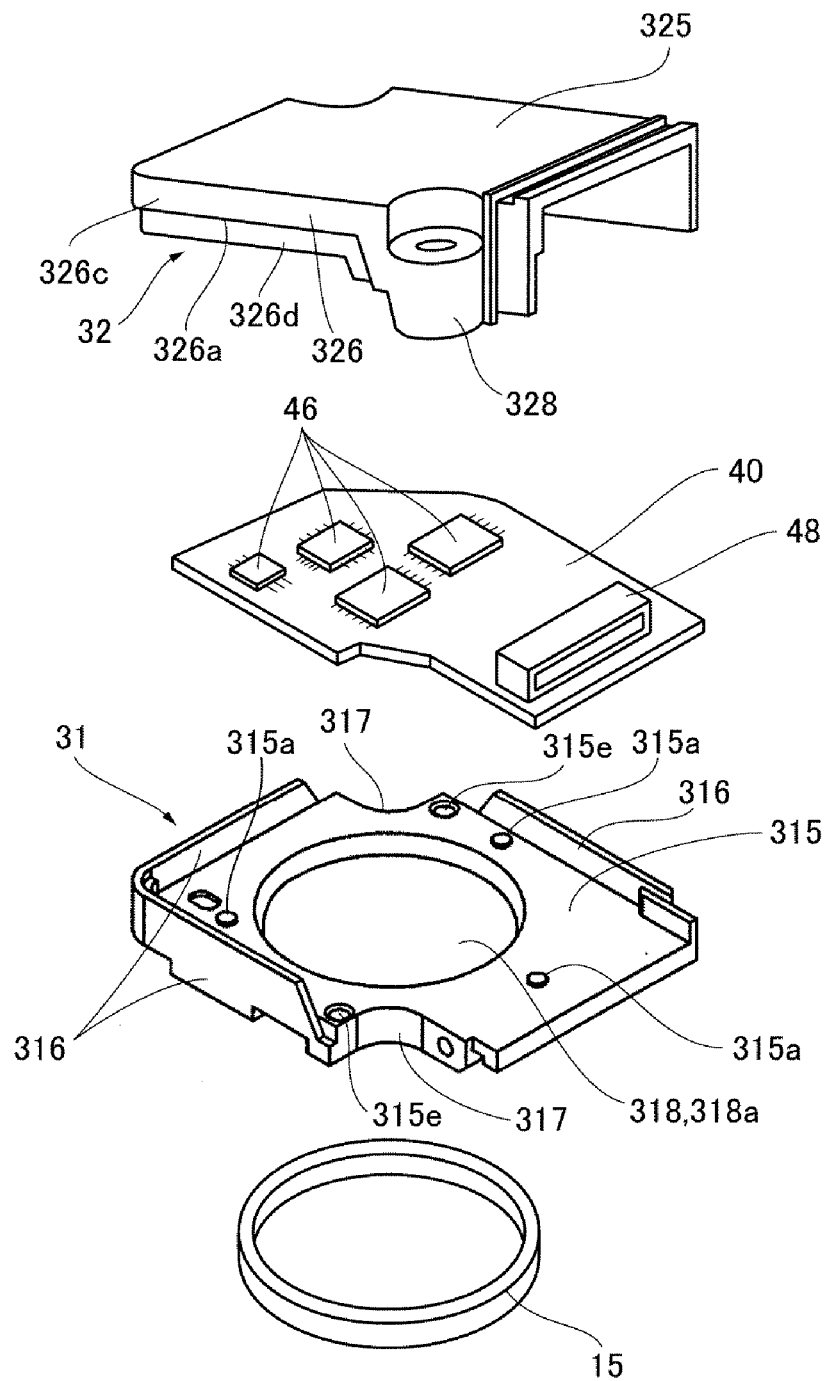
FIG. 5 is an explanatory view showing the disassembled circuit unit of the magnetic type rotation detection device in accordance with the first embodiment of the present invention which is viewed from a side of a second case body.

FIG. 1(a) is an outward appearance view showing a magnetic type rotation detection device in accordance with a first embodiment of the present invention and FIG. 1(b) is its exploded perspective view. FIG. 2(a) is a cross-sectional view schematically showing a structure of a part of the magnetic type rotation detection device in accordance with the first embodiment of the present invention and FIG. 2(b) is an explanatory view showing its detection principle. FIG. 3(a) is a perspective view showing a part of the magnetic type rotation detection device in accordance with the first embodiment of the present invention and FIG. 3(b) is a perspective view showing a state where a magnet body and a circuit unit are separated from each other. FIG. 4 is an explanatory view showing a disassembled circuit unit of the magnetic type rotation detection device in accordance with the first embodiment of the present invention which is viewed from a side of a first case body and FIG. 5 is an explanatory view showing the disassembled circuit unit which is viewed from a side of a second case body.

A magnetic type rotation detection device 10 which is shown in FIGS. 1(a) and 1(b) and FIG. 2(a) is a device which magnetically detects a rotating position, a rotating direction or a rotating speed of a rotation body. In this embodiment, the magnetic type rotation detection device 10 detects rotation of a rotation shaft 22 of a motor 2. In this embodiment, rotation of the rotation shaft 22 is detected with a motor case 27 as a reference. The magnetic type rotation detection device 10 is integrally structured with the motor 2 to structure an encoder motor 1. The rotation shaft 22 corresponds to an opposite-to-output side end part of an output shaft 28 of the motor 2.

The magnetic type rotation detection device 10 is provided with a magnet body 20, which is fixed to the rotation shaft 22 of the motor 2, and a circuit unit 30 within which a circuit board 40 on which a magnetic sensing element 42 and a semiconductor IC 46 are mounted is accommodated within a case 33. The magnetic sensing element 42 faces the magnet body 20 in a direction of a rotation center axial line "L" of the rotation shaft 22. In this embodiment, the magnetic sensing element 42 is structured of an MR element in which a magnetoresistive film 421 is disposed in a predetermined pattern.

The magnet body 20 is provided with a metal magnet holder 21 which is fixed to the rotation shaft 22 and a permanent magnet 25 formed in a disk-like shape. The permanent magnet 25 is fixed with an adhesive to an upper face of a flange part 213 whose diameter is enlarged at a tip end part of the magnet holder 21. In this embodiment, a face of the permanent magnet 25 facing to the magnetic sensing element 42 is, as shown in FIGS. 1(b) and 2(b), magnetized with one pair of an "S"-pole and an "N"-pole in a circumferential direction.

A rotation detection circuit which is structured of the semiconductor IC 46 in the circuit unit 30 is, as shown in FIG. 2(b), provided with a pair of amplifier circuits 481 to which a signal from the magnetic sensing element 42 is outputted, an arithmetic circuit 482 (interpolation circuit) which performs interpolation processing on sinusoidal signals "Sin" and "Cos" outputted from the amplifier circuits 481 to obtain zero crossing points or the like, and an output interface 483. A signal output from the rotation detection circuit to the outside is performed through a female connector 48 which is mounted on the circuit board 40.

(Structure of Circuit Unit)

As shown in FIGS. 1(a) and 1(b), FIG. 2(a), FIGS. 3(a) and 3(b), FIG. 4 and FIG. 5, in the magnetic type rotation detection device 10 in this embodiment, a case 33 of the circuit unit 30 is provided with a first case body 31, which is made of resin and located on a magnet body 20 side with respect to the circuit board 40, and a second case body 32 which is made of resin and located on an opposite side to the magnet body 20 with respect to the circuit board 40. The first case body 31 is structured as a partition member which is disposed between the magnet body 20 and the magnetic sensing element 42.

The first case body 31 is provided with a roughly rectangular plate-like part 315 and three side plate parts 316 which stand toward the second case body 32 at positions corresponding to three sides of the plate-like part 315. The plate-like part 315 is formed with a circular recessed part 318 which is recessed from the plate-like part 315 side toward an outer face side where the magnet body 20 is located. The first case body 31 is a resin molded product and a thickness of a bottom part 318a of the recessed part 318 is made thinner in comparison with a portion of the plate-like part 315 except the recessed part 318. A circuit board support part 315a which is a small protruded part is formed on an inner face of the plate-like part 315 so as to surround the recessed part 318. Therefore, the circuit board 40 is fixed to the plate-like part 315 in a facing state to the bottom part 318a of the recessed part 318 through the circuit board support parts 315a.

The magnetic sensing element 42 is mounted at a roughly center on a face side of the circuit board 40 facing the magnet body 20 (see FIGS. 4 and 5). The semiconductor IC 46 structuring the rotation detection circuit and the female connector 48 are mounted on a rear face side of the circuit board 40. The female connector 48 is mounted on the plate-like part 315 in the vicinity of a side where the side plate part 316 is not formed.

In the first case body 31 structured as described above, in a state that the circuit board 40 is supported by the circuit board support parts 315a, the magnetic sensing element 42 is disposed in the recessed part 318 and the bottom part 318a of the recessed part 318 functions as a partition part which is disposed between the magnetic sensing element 42 and the magnet body 20. In this state, a gap space is formed between the magnetic sensing element 42 and the bottom part 318a of the recessed part 318 (inner bottom part) and thus the magnetic sensing element 42 and the bottom part 318a of the recessed part 318 are arranged in a non-contact state (see FIG. 2(a)).

In the first case body 31, an outer face side of the plate-like part 315 where the magnet body 20 is located is, as shown in FIG. 4, formed with a circular annular groove 319 so as to surround the bottom part 318a of the recessed part 318 and an end part of a ring-shaped ring 15 is fitted and fixed to the annular groove 319 by a method such as adhesion. Only an end part of the ring 15 which is located on an opposite side to the magnet body 20 (side where the magnetic sensing element 42 is located) is fitted in the annular groove 319 and its opposite side end part is protruded toward a side where the magnet body 20 is located with respect to the bottom part 318a of the recessed part 318 (see FIGS. 3(a) and 3(b)). Moreover, an inner diameter dimension of the ring 15 is slightly larger than an outer diameter dimension of the magnet body 20. A permanent magnet 25 and the flange part 213 of the magnet body 20 are located on an inner side of the ring 15 which is structured as described above and, in this state, the ring 15 is arranged so as to face the outer peripheral face of the magnet body 20 through a gap space on an outer side in the radial direction.

The ring 15 is structured of magnetic material and functions to serve as a magnetic shielding member for the magnet body 20. Further, in the magnetic type rotation detection device 10 in this embodiment, as its manufacturing method will be described below, centers of the magnet body 20 and the magnetic sensing element 42 are aligned with each other with the ring 15 as a reference. Therefore, the center of the magnetic sensing element 42 is located on a center axial line of the ring 15 and the center of the magnet body 20 is located on the center axial line of the ring 15.

The second case body 32 is provided with a roughly rectangular plate-like part 325 which faces the plate-like part 315 of the first case body 31 and three side plate parts 326 which stand toward the side plate parts 316 of the first case body 31 at positions corresponding to three sides of the plate-like part 325. The sides where the respective side plate parts 316 and 326 are formed are corresponded to each other in the first case body 31 and the second case body 32. Therefore, when the second case body 32 is placed on the first case body 31, the side plate parts 316 and 326 are superposed on each other but a portion corresponding to one of four sides is formed in an opened state which opens toward the outside. Therefore, the female connector 48 is disposed in an exposed state to the outside and thus a male connector 49 can be connected with the female connector 48. In this embodiment, the plate-like part 325 of the second case body 32 is formed with protruded parts 325c which presses the circuit board 40 against the circuit board support parts 315a.

(Waterproof Structure for Magnetic Sensing Element 42)

When the first case body 31 and the second case body 32 structured as described above are superposed on each other, the side plate parts 316 of the first case body 31 covers outer faces of the side plate parts 326 of the second case body 32. In order to join the side plate parts 316 and 326 with each other by utilizing the overlapping portion, the side plate part 326 of the second case body 32 is formed with a thinner wall portion 326d which is extended toward the first case body 31 from an inner peripheral side of a thick wall portion 326c, i.e., a root portion of the side plate part 326. A width dimension of the thinner wall portion 326d is slightly wider than an overlapping portion with the side plate part 316 of the first case body 31. Therefore, when the first case body 31 and the second case body 32 are superposed on each other, a first groove part 36 which is formed between a stepped part 326a formed by the thick wall portion 326c and the thinner wall portion 326d and a tip end edge of the side plate part 316 of the first case body 31 is formed between the side plate part 316 of the first case body 31 and the side plate part 326 of the second case body 32. The first groove part 36 is formed in a continuous state over all of three side plate parts 316 and 326 of the first case body 31 and the second case body 32. Therefore, in this embodiment, a sealing agent 35 is applied to the entire first groove part 36 formed over the three side plate parts 316 and 326 and then solidified to prevent intrusion of water into the inside of the case 33. In a portion where the female connector 48 is located, a space between the first case body 31 and the second case body 32 is opened largely. However, before the male connector 49 is connected with the female connector 48 or after having been connected, when a sealing agent 35 is also applied to the space and solidified, intrusion of water into the case 33 is prevented. Material of the sealing agent 35 is not limited but silicone resin or the like may be used.

The side plate part 326 of the second case body 32 is formed with small projections 326e for fixing (see FIG. 4) and the plate-like part 315 of the first case body 31 is formed with bottomed small holes 315e (see FIG. 5) to which the small projections 326e are fitted. Therefore, when the small projection 326e of the second case body 32 is fitted into the small hole 315e of the first case body 31, the first case body 31 and the second case body 32 are coupled to each other.

(Positioning Structure by Spacer)

In the magnetic type rotation detection device 10 structured as described above, the case 33 of the circuit unit 30 is fixed to a motor case 27 through a spacer 50 whose external shape is a rectangular parallelepiped shape. In other words, the spacer 50 is fixed to an end face of the motor case 27 at diagonal positions by two bolts 59 as a fixing member, and the case 33 is fixed to an end face of the spacer 50 by two bolts 39 at diagonal position. In order to perform the fixing, when a cylindrical tube part for passing the bolt 59 is formed in both of the first case body 31 and the second case body 32, a sealing property at the joining portion is lowered. Therefore, in this embodiment, only the second case body 32 is formed with two cylindrical tube parts 328 for passing the shaft part of the bolt 39 so as to be continuously formed from the side plate part 326. Further, in this embodiment, in order to prevent water from intruding into the inside of the case 33 from the circumference of the cylindrical tube part 328, a cut-out part 317 formed in a circular arc shape is formed in the plate-like part 315 of the first case body 31 so as to avoid the cylindrical tube part 328. Further, when the first case body 31 and the second case body 32 are superposed on each other, a second groove part 37 is formed between the outer peripheral face of the cylindrical tube part 328 and the inner peripheral face of the cut-out part 317 so as to open toward a side where the magnet body 20 is located in the direction of the rotation center axial line "L". Therefore, in this embodiment, when the sealing agent 35 is applied to the first groove part 36, the sealing agent 35 is also applied to the second groove part 37. The first groove part 36 and the second groove part 37 are connected with each other to structure a continuous groove part. Accordingly, the entire periphery of the case 33 except the portion where the female connector 48 is disposed is sealed with the sealing agent 35.

An external shape of the spacer 50 which is used in this embodiment is a rectangular parallelepiped shape but the spacer 50 is formed with a circular through hole 51 which is opened in the rotation center axial line "L" direction of the rotation shaft 22. The magnet body 20 is located within the through hole 51. An inner diameter dimension of the through hole 51 is larger than an outer diameter dimension of the flange part 213 of the magnet body 20 and thus a ring shaped space is formed over the entire periphery between the inner peripheral face of the through hole 51 and the outer peripheral face of the magnet body 20. An end part of the ring 15 is inserted into the space. An outer diameter dimension of the ring 15 is substantially the same as the inner diameter dimension of the through hole 51 and thus the ring 15 is in a state that the ring 15 is fitted into the through hole 51. In this state, a clearance is formed between the outer peripheral face of the flange part 213 of the magnet body 20 and the inner peripheral face of the ring 15. In this manner, the ring 15 is positioned in the radial direction with respect to the spacer 50.

(Manufacturing Method for Magnetic Type Rotation Detection Device 10)

FIGS. 6(a) through 6(e) are explanatory views showing a manufacturing method for the magnetic type rotation detection device 10 in accordance with the first embodiment of the present invention. In order to manufacture the magnetic type rotation detection device 10 in this embodiment, first, in a first alignment step, a ring 15 is fixed to a first case body 31 in a state that the first case body 31 is not fixed to a second case body 32, and the ring 15 and a magnetic sensing element 42 are aligned with each other so that a center of the magnetic sensing element 42 is located on a center axial line of the ring 15 and then, a circuit board 40 is fixed to the first case body 31. More specifically, for example, the ring 15 and the circuit board 40 are respectively held by two robot hands and, after adjusted their positions, the circuit board 40 is fixed to the first case body 31. In this case, the circuit board 40 is temporarily adhesively bonded to the first case body 31 by using a quick-drying adhesive such as a UW adhesive and then, the circuit board 40 is finally adhesively bonded to the first case body 31 by using an adhesive which is a thermosetting resin. After that, the second case body 32 is fitted to the first case body 31. Specifically, the small projections 326e of the second case body 32 are fitted and fixed to the small holes 315e of the first case body 31 and, in this state, a sealing agent 35 is applied to the first groove part 36 and the second groove part 37 and solidified to seal the case 33.

Figure 6A:
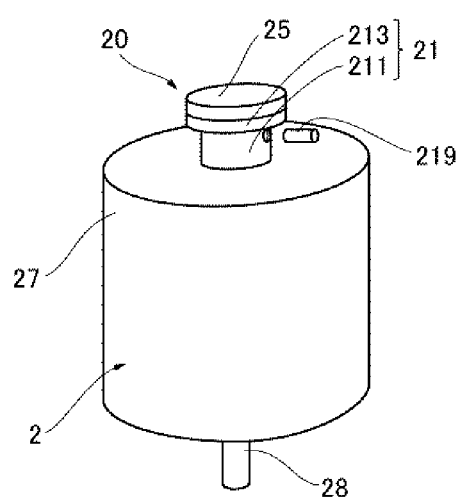
FIGS. 6(a) through 6(e) are explanatory views showing a manufacturing method for the magnetic type rotation detection device in accordance with the first embodiment of the present invention.
Figure 6B:
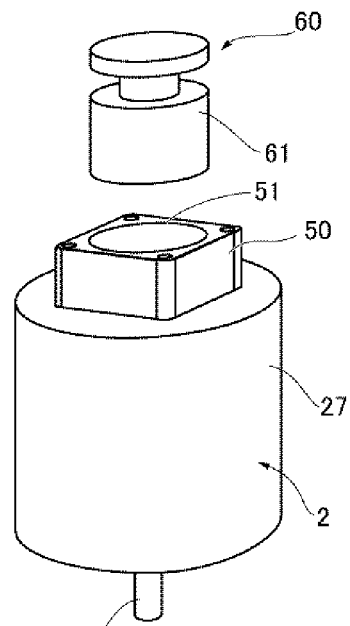

Next, in a second alignment step, alignment of the ring 15 with the magnet body 20 is performed so that the center of the magnet body 20 is located on the center axial line of the ring 15. Specifically, first, as shown in FIGS. 6(a) and 6(e), the rotation shaft 22 of the motor 2 is fitted into a hole which is formed at an end part of the shaft part 211 of the magnet holder 21 and then, a set screw 219 is fitted from a side into a hole formed on a peripheral face of the shaft part 211 for restricting movement in a rotating direction and the magnet body 20 is fixed to the rotation shaft 22. Next, as shown in FIGS. 6(b) and 6(e), the spacer 50 is disposed on an end face of the motor case 27 so that the magnet body 20 is disposed within the through hole 51 of the spacer 50 (first operation).

Figure 6C:
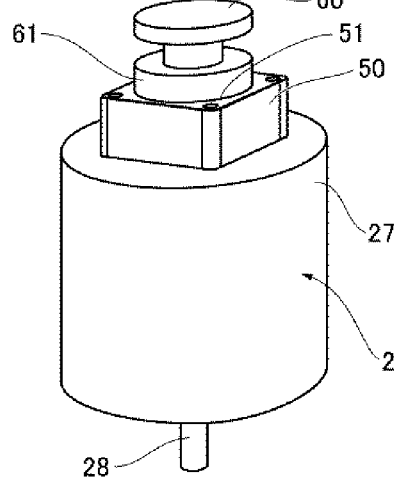
Figure 6D:
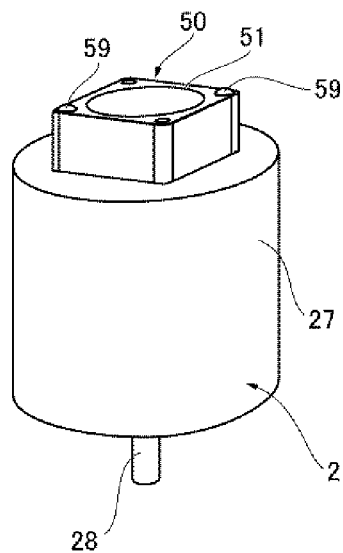
Figure 6E:
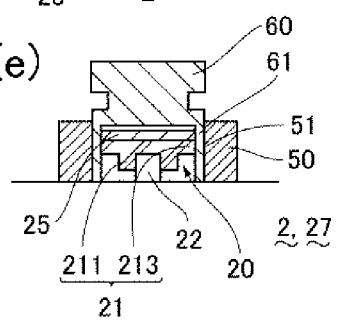

Next, as shown in FIGS. 6(c) and 6(e), a cylindrical tube part 61 of a jig 60 is inserted between an inner wall of the through hole 51 of the spacer 50 and the outer peripheral face of the magnet body 20 and alignment of the spacer 50 with the magnet body 20 is performed by using the jig 60 (second operation). In other words, the jig 60 is provided with a cylindrical tube part 61 whose wall thickness in the circumferential direction is constant. An inner diameter dimension of the cylindrical tube part 61 is substantially the same as outer diameter dimensions of the flange part 213 and the permanent magnet 25 of the magnet body 20 and substantially the same as the inner diameter dimension of the through hole 51 of the spacer 50. Therefore, in the state shown in FIGS. 6(c) and 6(e), the through hole 51 of the spacer 50 and the flange part 213 and the permanent magnet 25 of the magnet body 20 are disposed in a concentric manner.

Next, as shown in FIG. 6(d), the spacer 50 is fixed to the motor case 27 by using bolts 59 and, after that, the jig 60 is detached (third operation).

Next, the ring 15 of the circuit unit 30 which is assembled in a state shown in FIG. 3(b) is inserted into the through hole 51 of the spacer 50 and then, the case 33 of the circuit unit 30 is fixed to the spacer 50 by using bolts 39 (fourth operation). As a result, a magnetic type rotation detection device 10 has been assembled in a state that the ring 15 and the magnet body 20 are aligned with each other so that the center of the magnet body 20 is located on the center axial line of the ring 15.

(Principal Effects in this Embodiment)

As described above, in the magnetic type rotation detection device 10 in this embodiment, the ring 15 is fixed to the plate-like part 315 of the first case body 31 which is disposed as a partition member between the magnet body 20 and the magnetic sensing element 42 and the positions of the magnet body 20 and the magnetic sensing element 42 are determined with the ring 15 as a reference. In other words, in the manufacturing method for the magnetic type rotation detection device 10, the position of the magnetic sensing element 42 on the first case body 31 is determined with the ring 15 as a reference, and the positions of the magnetic sensing element 42 and the magnet body 20 are determined with the ring 15 as a reference by utilizing the spacer 50 and the jig 60. Therefore, a high degree of positional accuracy between the magnetic sensing element 42 and the magnet body 20 is attained.

Further, in order to fix the ring 15 to the first case body 31, the ring 15 is fitted into the annular groove 319 which surrounds the recessed part 318. Therefore, the ring 15 is surely fixed at a predetermined position of the first case body 31.

In addition, the ring 15 functions as a magnetic shielding part for the magnet body 20 and thus, even when a special shielding member is not used, magnetic shielding can be performed.

Further, in the magnetic type rotation detection device 10 in this embodiment, the number of magnetic pole pair which is formed in the magnet body 20 is reduced and, instead, resolution is secured by means of that arithmetic processing is performed such that, for example, interpolation processing is performed on a signal provided from the magnetic sensing element 42 to obtain zero crossing points. According to the structure described above, the magnetic pole pair formed in the magnet body 20 is reduced to the minimum one pair and thus, even when the magnet body 20 and the magnetic sensing element 42 are separated from each other in some degree, sufficient sensitivity is obtained. Moreover, since the magnet body 20 and the magnetic sensing element 42 are faced each other in the rotation center axial line "L" direction of the rotation shaft 22, even when the magnet body 20 and the magnetic sensing element 42 are separated from each other in some degree, a sinusoidal signal with reduced waveform distortion is obtained through the magnetic sensing element 42. Therefore, a partition part (bottom part 318a of the recessed part 318 of the first case body 31) is capable of being provided between the magnet body 20 and the magnetic sensing element 42. Further, in at least an embodiment of the present invention, the magnetic sensing element 42 is covered by the first case body 31 and the second case body 32 and, in addition, the first case body 31 and the second case body 32 are joined with each other so as to surround around the magnetic sensing element 42 and the sealing agent 35 is applied to the joined portion. Therefore, the case 33 is provided with waterproof structure and thus the magnetic sensing element 42 is surely protected from water.

Further, the partition part is the bottom part 318a of the recessed part 318 in the plate-like part which is recessed toward the side where the magnet body 20 is located and the magnetic sensing element 42 is disposed in the recessed part 318. There is limitation to reduce thickness of the entire plate-like part 315 of the first case body 31 but, in this embodiment, the magnetic sensing element 42 and the magnet body 20 can be approached to each other. Further, the circuit board 40 on which the magnetic sensing element 42 is mounted is disposed so as to be placed on the circuit board support parts 315a which are formed circumferentially around the recessed part 318 on the plate-like part 315 and thus the magnetic sensing element 42 is separated from the bottom part 318a of the recessed part 318 through a space. Therefore, the magnetic sensing element 42 is disposed in a non-contact state on the partition plate (bottom part 318a of the recessed part 318). Accordingly, even when the magnetic sensing element 42 and the magnet body 20 are approached to each other, an unnecessary stress is not applied to the magnetic sensing element 42 and thus the magnetic sensing element 42 with a high sensitivity is attained.

Further, a portion between the first case body 31 and the second case body 32 is sealed with the sealing agent 35 which is applied to the portion and thus intrusion of water through the side plate parts 316 and 326 of the first case body 31 and the second case body 32 is prevented effectively. Moreover, the sealing agent 35 is applied to the inside of the first groove part 36 and the second groove part 37. Further, the first groove part 36 and the second groove part 37 structure a continuously connected groove part. Therefore, the entire periphery of the case 33 except the portion where the female connector 48 is disposed is sealed with the sealing agent 35 and thus intrusion of water is prevented surely.

Modified Example of First Embodiment

In the first embodiment, the side plate part 316 of the first case body 31 is overlapped with the outer face of the side plate part 326 of the second case body 32 and thus the side plate part 326 of the second case body 32 is formed with the stepped part 326a to provide the first groove part 36. However, in a case that the side plate part 326 of the second case body 32 is overlapped with the outer face of the side plate part 316 of the first case body 31, a stepped part may be formed on the side plate part 316 of the first case body 31 to provide the first groove part 36.

Second Embodiment

Structure of Magnetic Type Rotation Detection Device

Figure 7:
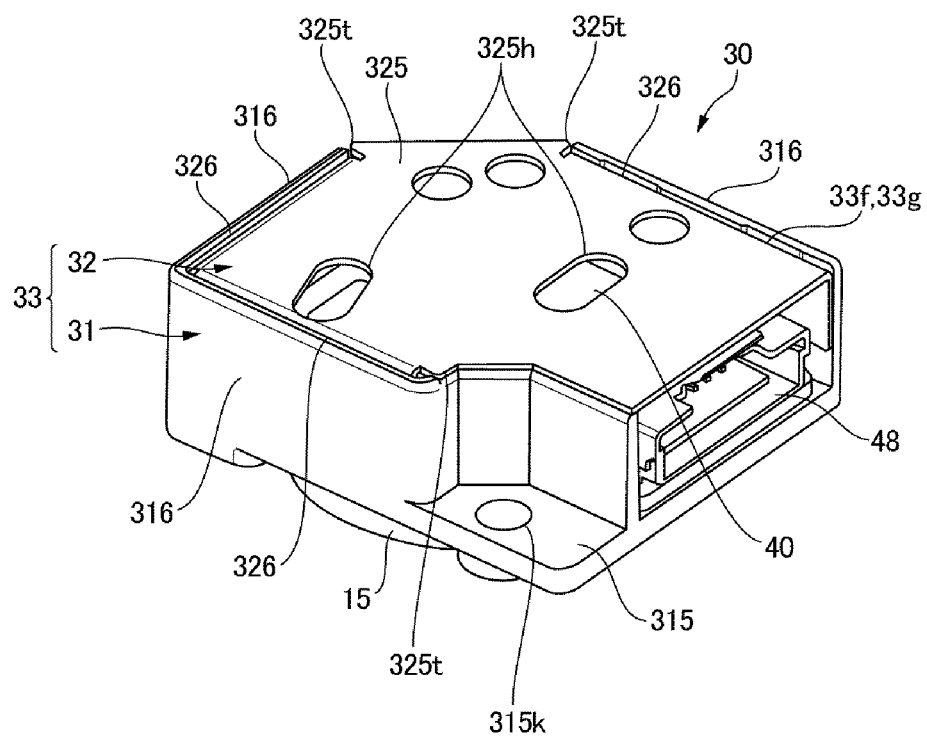
FIG. 7 is an outward appearance view showing a circuit unit which is used in a magnetic type rotation detection device in accordance with a second embodiment of the present invention.
Figure 8A:
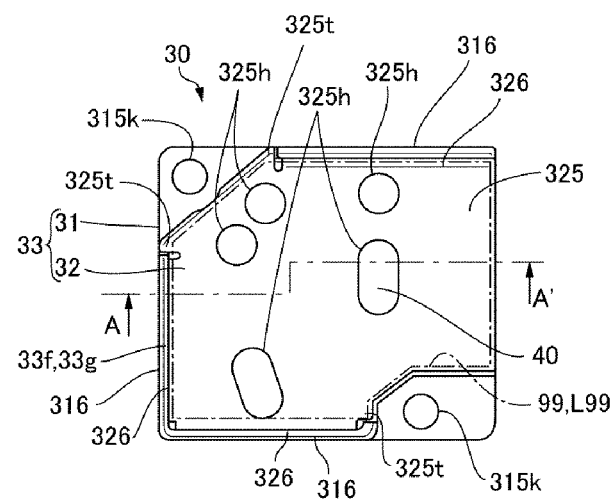
FIG. 8(a) is a plan view showing a circuit unit which is used in the magnetic type rotation detection device in accordance with the second embodiment of the present invention and FIG. 8(b) is an enlarged cross-sectional view showing the circuit unit which is cut by the "A-A'" line.
Figure 8B:
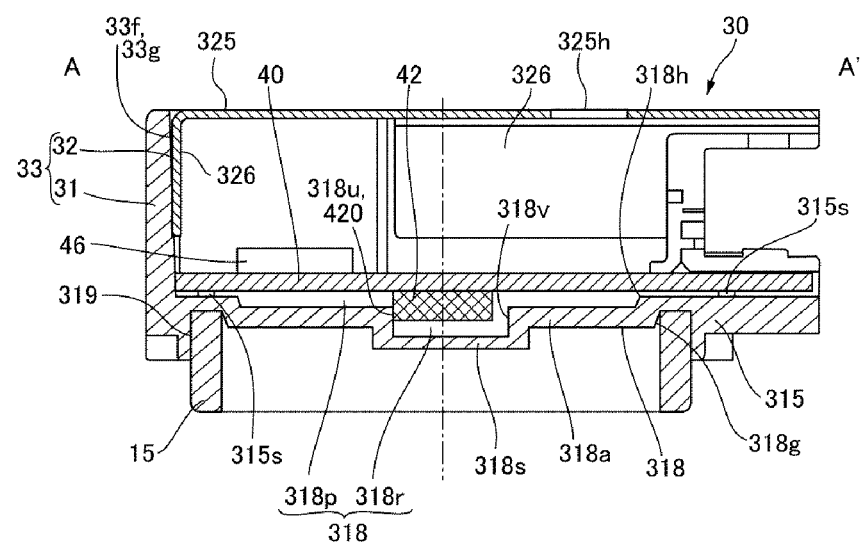
Figure 9:
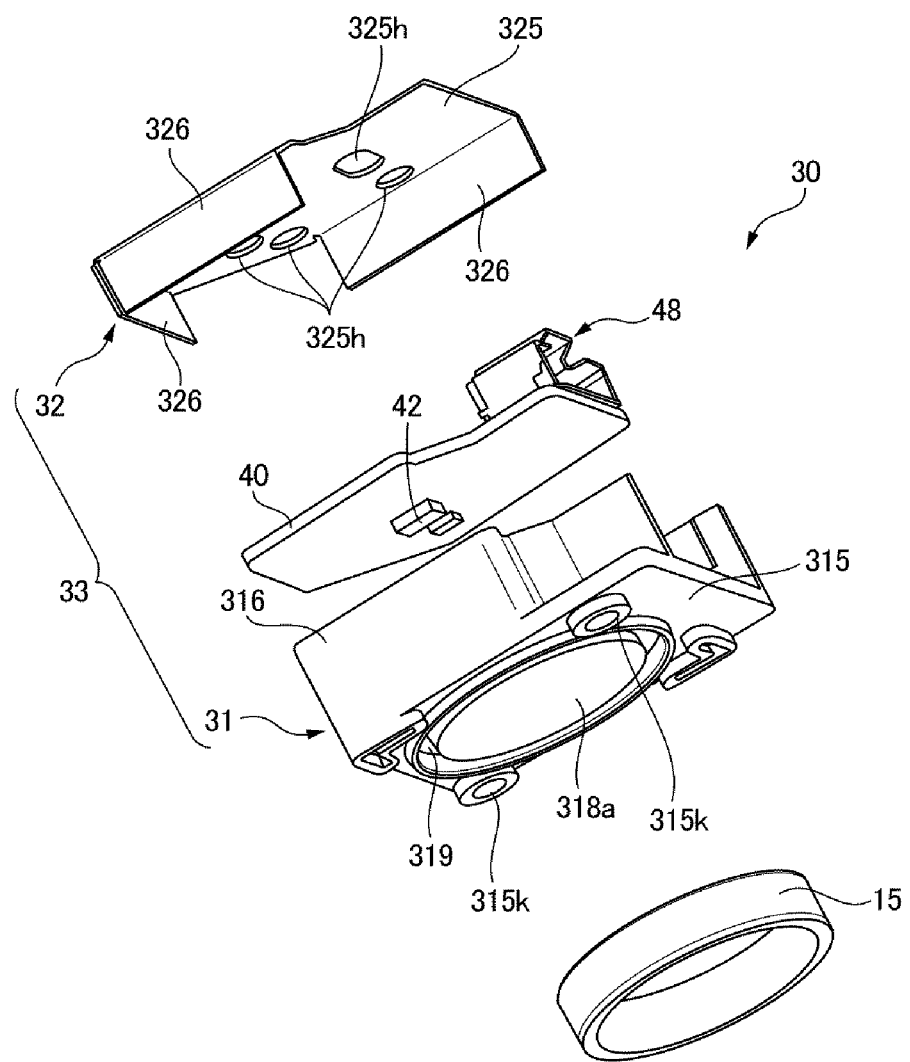
FIG. 9 is an explanatory view showing a disassembled circuit unit of the magnetic type rotation detection device in accordance with the second embodiment of the present invention which is viewed from a side of a first case body.
Figure 10:
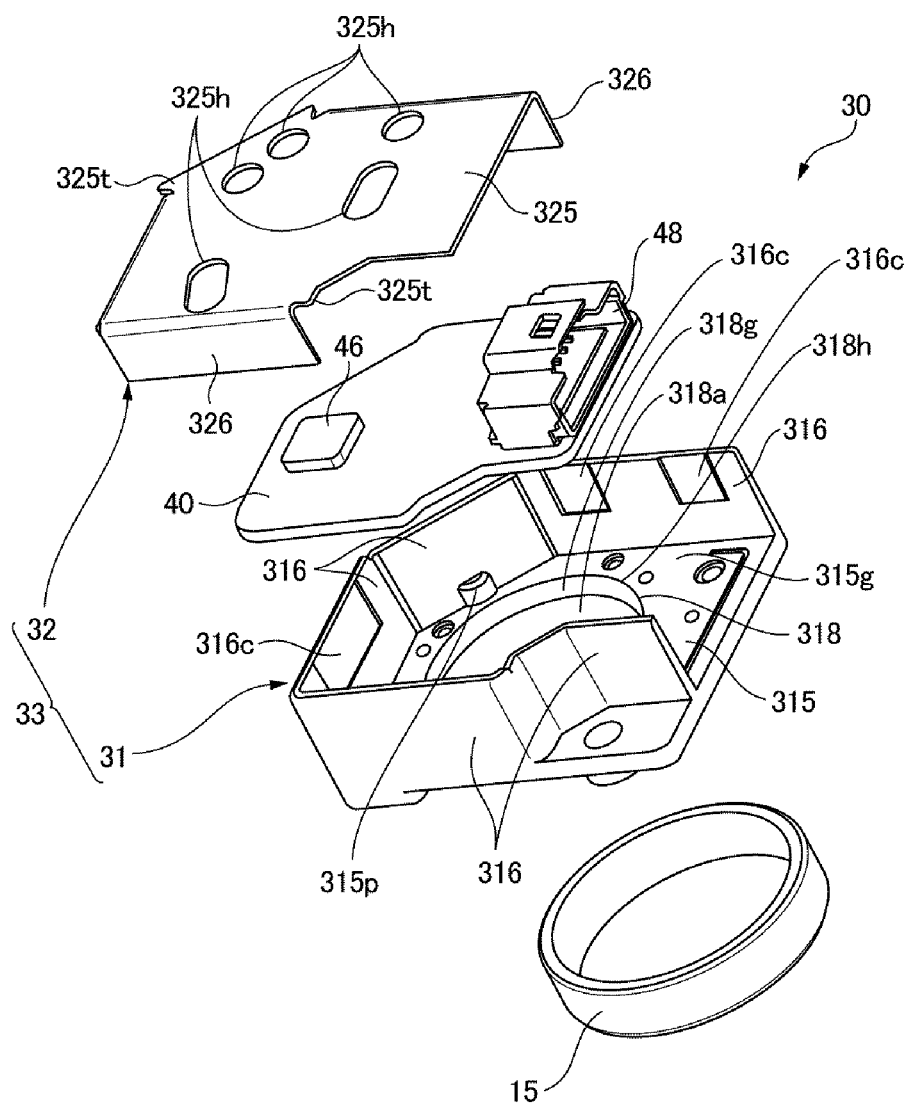
FIG. 10 is an explanatory view showing the disassembled circuit unit of the magnetic type rotation detection device in accordance with the second embodiment of the present invention which is viewed from a side of a second case body.
Figure 11A:
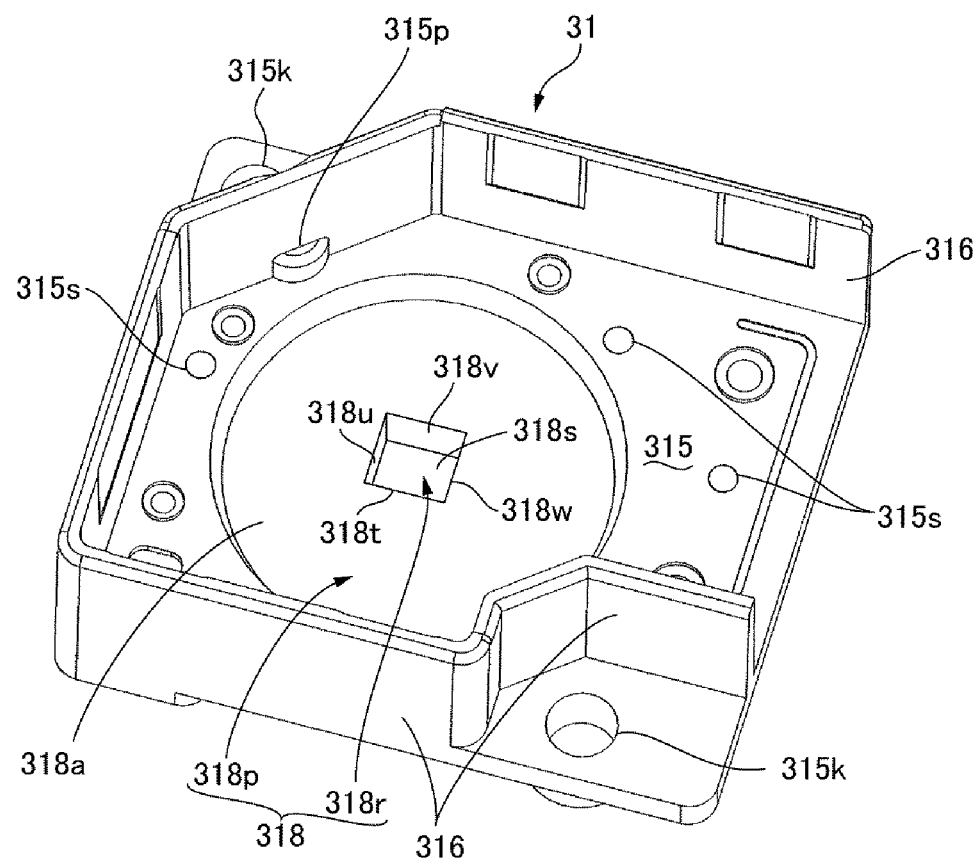
FIG. 11(a) is an explanatory view showing a recessed part formed in the first case body which is used in the magnetic type rotation detection device in accordance with the second embodiment of the present invention and FIG. 11(b) is a cross-sectional view showing a magnetic sensing element.
Figure 11B:
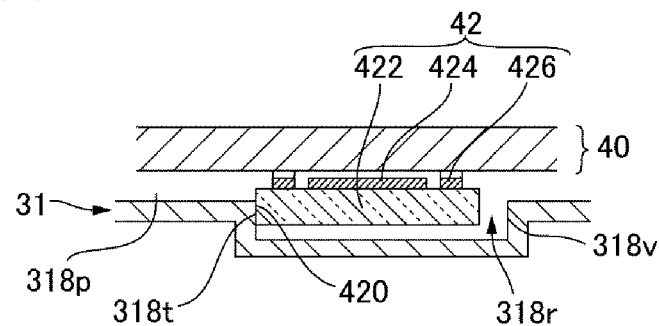

FIG. 7 is an outward appearance view showing a circuit unit which is used in a magnetic type rotation detection device in accordance with a second embodiment of the present invention. FIG. 8(a) is a plan view showing a circuit unit which is used in the magnetic type rotation detection device in accordance with the second embodiment of the present invention and FIG. 8(b) is an enlarged cross-sectional view showing the circuit unit which is cut by the "A-A'" line. FIG. 9 is an explanatory view showing a disassembled circuit unit of the magnetic type rotation detection device in accordance with the second embodiment of the present invention which is viewed from a side of a first case body. FIG. 10 is an explanatory view showing the disassembled circuit unit which is viewed from a side of a second case body. FIG. 11(a) is an explanatory view showing a recessed part formed in the first case body which is used in the magnetic type rotation detection device in accordance with the second embodiment of the present invention and FIG. 11(b) is a cross-sectional view showing a magnetic sensing element. A basic structure in the second embodiment is substantially similar to the first embodiment and thus the same reference signs are used in portions provided with common functions and their descriptions are omitted. Further, the entire structure of the magnetic type rotation detection device will be described below with reference to FIG. 1.

As shown in FIGS. 1(a) and 1(b) and FIG. 2(a), similarly to the first embodiment, a magnetic type rotation detection device 10 in the second embodiment is also provided with a magnet body 20 which is fixed to the rotation shaft 22 of the motor 2, and a circuit unit 30 within which a circuit board 40 on which a magnetic sensing element 42 and a semiconductor IC 46 are mounted is accommodated within a case 33. The magnetic sensing element 42 faces the magnet body 20 in a direction of a rotation center axial line "L" of the rotation shaft 22. In this embodiment, the magnetic sensing element 42 is structured of an MR element in which a magneto-resistive film 421 is disposed in a predetermined pattern. The magnet body 20 is provided with a permanent magnet 25 formed in a disk-like shape and a face of the permanent magnet 25 facing to the magnetic sensing element 42 is magnetized with one pair of an "S"-pole and an "N"-pole in a circumferential direction.

As shown in FIG. 7, FIGS. 8(a) and 8(b), FIG. 9 and FIG. 10, similarly to the first embodiment, in the magnetic type rotation detection device 10 in the second embodiment, a case 33 of the circuit unit 30 is provided with a first case body 31 which is located on a magnet body 20 side with respect to the circuit board 40 and a second case body 32 which is located on an opposite side to the magnet body 20 with respect to the circuit board 40. The first case body 31 is structured as a partition member which is disposed between the magnet body 20 and the magnetic sensing element 42.

The first case body 31 is provided with a substantially pentagonal plate-like part 315 and four side plate parts 316 which stand toward the second case body 32 from an outer peripheral end part of the plate-like part 315. A part of the side plate part 316 stands up at a position on an inner side from the outer peripheral end part of the plate-like part 315. The plate-like part 315 is formed with a circular recessed part 318 which is recessed from the plate-like part 315 toward an outer face side where the magnet body 20 is located. A thickness of a bottom part 318a of the recessed part 318 is made thinner in comparison with a portion of the plate-like part 315 except the recessed part 318. Further, a ring shaped inner peripheral wall part 318g of the recessed part 318 is formed in an inclined conical face in which an inner diameter of the recessed part 318 is made smaller from an opening edge 318h of the recessed part 318 toward the bottom part 318a. In this embodiment, a region which is surrounded by the side plate part 316 is a disposing space for the circuit board 40 and the circuit board 40 is disposed in a portion surrounded by the side plate part 316 on the inner face of the plate-like part 315. The circuit board 40 is supported in an attitude so as to face the plate-like part 315 through a plurality of projections 315s (circuit board support part) formed on the plate-like part 315. The plate-like part 315 is formed at two diagonal positions with a hole 315k through which a bolt 39 shown in FIG. 1 is passed. Further, a semi-cylinder-shaped projection 315p is formed at a corner portion where the plate-like part 315 is connected with the side plate part 316 and the projection 315p indicates the position where the circuit board 40 is disposed.

In this embodiment, similarly to the first embodiment, the first case body 31 is a resin molded product formed of PPS or the like. Specifically, in this embodiment, the first case body 31 is a resin molded product having electro-conductivity which is filled with conductive filler.

The magnetic sensing element 42 is mounted on the circuit board 40 at a roughly center of a face facing the magnet body 20. Further, the semiconductor IC 46 structuring the rotation detection circuit and the female connector 48 are mounted on a rear face side of the circuit board 40. The female connector 48 is mounted on the plate-like part 315 in the vicinity of a side where the side plate part 316 is not formed.

In the magnetic type rotation detection device 10 structured as described above, as shown in FIG. 8(b) and FIG. 11(a), the recessed part 318 of the plate-like part 315 of the first case body 31 includes a first recessed part 318p having a large diameter and a second recessed part 318r which is recessed at a substantially center position of the bottom part 318a of the first recessed part 318p so that its planar shape is a substantially quadrangular shape. The second recessed part 318r is provided with a bottom part 318s and four inner peripheral side faces 318t, 318u, 318v and 318w.

The magnetic sensing element 42 is, as shown in FIG. 11(b), provided with an element main body 424 comprised of a magneto-resistive pattern and a protective layer 422 which covers the element main body 424. In this embodiment, the magnetic sensing element 42 is structured so that a magneto-resistive pattern as the element main body 424, a surface protective layer (not shown) for covering the magneto-resistive pattern, terminals 426 and the like are formed on one face of a nonmagnetic substrate such as glass. The protective layer 422 is structured of the nonmagnetic substrate. A planar shape of the magnetic sensing element 42 is determined by a shape of the nonmagnetic substrate, which is the protective layer 422, and is a substantially quadrangular shape. Further, a plane size of the magnetic sensing element 42 is slightly smaller than the second recessed part 318r which is shown in FIG. 8(b) and FIG. 11(a) and the magnetic sensing element 42 is fitted on an inner side of the second recessed part 318r. Further, two side parts adjacent to each other in the circumferential direction among outer peripheral end parts 420 of the magnetic sensing element 42 (outer peripheral end parts of the protective layer 422) are abutted with two inner peripheral side faces 318t and 318u adjacent to each other among four inner peripheral side faces 318t, 318u, 318v and 318w of the second recessed part 318r. Therefore, the magnetic sensing element 42 is positioned in an in-plane direction of the second recessed part 318r by the inner peripheral side faces 318t and 318u.

The circuit board 40 which is structured as described above is supported by protruded parts 315s of the plate-like part 315 when disposed in the first case body 31. In this state, a gap space is provided between the protective layer 422 of the magnetic sensing element 42 and the bottom part 318a of the recessed part 318 (bottom part 318s of the second recessed part 318r) and thus the magnetic sensing element 42 and the bottom part 318a of the recessed part 318 (bottom part 318s of the second recessed part 318r) are in a non-contact state with each other.

In the first case body 31, an outer face side of the plate-like part 315 where the magnet body 20 is located is formed with a circular annular groove 319 so as to surround the bottom part 318a of the recessed part 318 and an end part of a ring-shaped ring 15 is fitted and fixed to the annular groove 319 by a method such as adhesion. Also in this embodiment, similarly to the first embodiment, only an end part of the ring 15 which is located on an opposite side to the magnet body 20 (side where the magnetic sensing element 42 is located) is fitted in the annular groove 319, and its opposite side end part is protruded toward a side where the magnet body 20 is located with respect to the bottom part 318a of the recessed part 318.

Further, an inner diameter dimension of the ring 15 is slightly larger than an outer diameter dimension of the magnet body 20. A permanent magnet 25 of the magnet body 20 and the flange part 213 are located on an inner side of the ring 15 which is structured as described above and, in this state, the ring 15 is disposed so as to face the outer peripheral face of the magnet body 20 through a gap space on an outer side in the radial direction. The ring 15 is structured of magnetic material and functions to serve as a magnetic shielding member for the magnet body 20. Further, in the magnetic type rotation detection device 10 in this embodiment, as its manufacturing method will be described below, positions of the magnet body 20, the first case body 31 and the circuit board 40 are determined with the ring 15 as a reference. Further, the second recessed part 318r is formed so that the center of the magnetic sensing element 42 is located at the center of the annular groove 319. Therefore, according to the manufacturing method described below, the center of the magnetic sensing element 42 is located on the center axial line of the ring 15 and the center of the magnet body 20 is located on the center axial line of the ring 15.

The second case body 32 is provided with a plate-like part 325 which faces the plate-like part 315 of the first case body 31 and an external shape of the plate-like part 325 is a shape substantially superposed on the side plate part 316 of the first case body 31. In the second case body 32, a side plate part 326 is stood up toward the side plate part 316 of the first case body 31 from an outer peripheral end part of the plate-like part 325. When the second case body 32 is covered on the first case body 31, the side plate part 316 and the side plate part 326 are overlapped with each other in an inner and outer direction so that the side plate part 316 is located on an outer side of the side plate part 326. In this embodiment, a protruding dimension (height dimension) of the side plate part 326 from the plate-like part 325 is shorter than a protruding dimension (height dimension) of the side plate part 316 from the plate-like part 315. Therefore, in a state that the second case body 32 is placed on the first case body 31, the side plate part 326 of the second case body 32 is not reached to the plate-like part 315 of the first case body 31 and thus a gap space is formed between the lower end part of the side plate part 326 and the plate-like part 315.

A protruded part 325t is formed in the plate-like part 325 of the second case body 32 in the vicinity of a side end part of the side plate part 326. When the second case body 32 is covered on the first case body 31, the protruded part 325t is placed on an upper end part of the side plate part 316 and engaged with the side plate part 316. Accordingly, even when the second case body 32 is disposed on an inner side of the first case body 31, the height position of the second case body 32 is determined. When the second case body 32 is placed on the first case body 31 as described above, an opening part is formed so as to open toward a side between the first case body 31 and the second case body 32. Therefore, a female connector 48 is disposed in an exposed state to the outside. In his embodiment, although the side plate part 326 of the second case body 32 is also discontinued and not provided in a portion other than the portion where the female connector 48 is disposed, the discontinuity portion of the side plate part 326 is closed by the side plate part 316 of the first case body 31.

In this embodiment, a shallow recessed part 316c is formed on an inner peripheral face of the side plate part 316 of the first case body 31 at plural portions from a midway position in the height direction to an upper end edge of the side plate part 316 and, on the other hand, an outer face of the side plate part 326 of the second case body 32 is flat. Therefore, when the second case body 32 is fitted to the first case body 31, a narrow gap space 33g is formed between the side plate part 316 and the side plate part 326 and a wider gap space which is opened upward is formed by the recessed part 316c. Accordingly, when an adhesive 33f for sealing is applied to the narrow gap space between the side plate part 316 and the side plate part 326, the recessed part 316c functions as a reservoir part for the adhesive 33f. Therefore, when the adhesive 33f is solidified, the first case body 31 and the second case body 32 are bonded with each other to structure the case 33 and a space between the side plate part 316 and the side plate part 326 is surely closed by the adhesive 33f. Accordingly, the case 33 is provided with waterproof performance. In this case, although the lower end part of the side plate part 326 of the second case body 32 is fixed to the side plate part 316 of the first case body 31 with the adhesive 33f, a gap space is formed between the lower end part of the side plate part 326 and the plate-like part 315 of the first case body 31. Therefore, the second case body 32 is not floated by the adhesive 33f entered between the lower end part of the side plate part 326 and the plate-like part 315 and thus the second case body 32 is accurately fixed at a predetermined height position. The discontinuity portion of the side plate part 326 is closed only by the side plate part 316 but the waterproof performance for the case 33 is secured by applying a sealing agent between the upper end edge of the side plate part 316 and the end part of the plate-like part 325 of the second case body 32.

In this embodiment, the entire second case body 32 is made of metal which is formed of iron-based magnetic material and is also provided with electro-conductivity. Further, the first case body 31 is also provided with electro-conductivity. Therefore, when parts of the first case body 31 and the second case body 32 are set to be contacted with each other, the first case body 31 and the second case body 32 are electrically connected with each other. In other words, in this embodiment, the first case body 31 or the second case body 32 is electrically connected with the circuit board 40, the motor case 27 (see FIG. 1), or a motor frame (not shown) fixed to the motor case 27 through a wiring member for conducting to the ground. Therefore, an electric noise which is going to intrude into the inside of the case 33 from the outside is transmitted through the first case body 31 and the second case body 32 to the ground through the wiring member. Accordingly, the semiconductor IC 46 and the magnetic sensing element 42 structuring the rotation detection circuit which is described with reference to FIG. 2(b) are protected from electric noises and thus a signal in the inside of the case 33 which is outputted from the magnetic sensing element 42 is hard to be affected by electric noises from the periphery. Therefore, the magnetic type rotation detection device 10 is capable of performing a desired detection without being affected by disturbance noises. Further, the side of the magnetic sensing element 42 where the circuit board 40 is located is covered by the plate-like part 325 of the second case body 32 and thus magnetic shielding is performed.

Further, in this embodiment, holes 325h formed in an elliptical shape and a perfect circular shape are formed in the plate-like part 325 of the second case body 32. The holes 325h are formed to open at positions overlapping with the semiconductor IC 46 mounted on the circuit board 40, the wiring patterns of the circuit board 40 and the like so as to be in communication with the inside of the case 33. Therefore, terminals of the semiconductor IC 46 mounted on the circuit board 40, wiring patterns of the circuit board 40 and the like are visible through the holes 325h. Accordingly, in the circuit unit 30 in this embodiment, even after the magnetic type rotation detection device 10 has been mounted on the motor 2 as shown in FIG. 1(a), parameter inputting and parameter changing for offset adjustment or the like can be performed on the semiconductor IC 46 by inserting pin-shaped terminals through the holes 325h. In other words, the magnetic type rotation detection device 10 in this embodiment is completed in a state that the circuit unit 30 and the magnet body 20 are mounted on the motor 2 and thus characteristic checking can be performed only after the circuit unit 30 and the magnet body 20 have been mounted on the motor 2. However, in the magnetic type rotation detection device 10 in this embodiment, since the holes 325h are formed in the plate-like part 325 of the second case body 32, even when the second case body 32 is not detached, inputting or changing of a parameter can be performed on the semiconductor IC 46. Therefore, while monitoring the magnetic type rotation detection device 10 in a state that the magnetic type rotation detection device 10 is provided with the second case body 32 and mounted on the motor 2, inputting or changing of a parameter to the semiconductor IC 46 can be performed and thus adjustment can be performed in a finished product state where effect of the second case body 32 formed of magnetic body is provided.

After characteristic checking, or inputting or changing of a parameter to the semiconductor IC 46 has been performed, as shown by the alternate long and short dash line "L99" in FIG. 8(*a*), a sheet 99 such as a seal is affixed for closing the holes 325h and thus foreign matters are prevented from entering into the inside of the case 33. Other structures are similar to the first embodiment and thus their descriptions are omitted.

(Manufacturing Method for Magnetic Type Rotation Detection Device 10)

Also in a case that the magnetic type rotation detection device 10 in this embodiment is to be manufactured, similarly to the first embodiment, first, in a first alignment step, a ring 15 is fixed to a first case body 31 in a state that the first case body 31 is not coupled to a second case body 32, and the ring 15 and a magnetic sensing element 42 are aligned with each other so that a center of the magnetic sensing element 42 is located on a center axial line of the ring 15 and then, a circuit board 40 is fixed to the first case body 31. More specifically, for example, the ring 15 and the circuit board 40 are respectively held by two robot hands and, after adjusted their positions, the circuit board 40 is fixed to the first case body 31. In this case, the magnetic sensing element 42 is fitted into the second recessed part 318r and positioned. In this state, a gap space is formed between the magnetic sensing element 42 and the bottom part 318s of the second recessed part 318r and thus the magnetic sensing element 42 and the bottom part 318s of the second recessed part 318r are disposed in a non-contact state with each other. Further, the circuit board 40 is temporarily adhesively bonded to the first case body 31 by using a quick-drying adhesive such as a UV adhesive and then, the circuit board 40 is finally adhesively bonded to the first case body 31 by using an adhesive which is a thermosetting resin. After that, the first case body 31 is fitted to the second case body 32 and, in this state, an adhesive 33f for sealing is applied to the gap space 33g between the side plate part 316 and the side plate part 326 and the first case body 31 and the second case body 32 are bonded with each other to structure the case 33.

Next, in a second alignment step, alignment of the ring 15 with the magnet body 20 is performed so that the center of the magnet body 20 is located on the center axial line of the ring 15. In order to perform the alignment, similarly to the first embodiment, as shown in FIGS. 6(*a*) and 6(*e*), the rotation shaft 22 of the motor 2 is fitted into a hole which is formed at an end part of the shaft part 211 of the magnet holder 21 and then, a set screw 219 is fitted from a side into a hole formed on a peripheral face of the shaft part 211 for restricting movement in a rotating direction and the magnet body 20 is fixed to the rotation shaft 22. Next, as shown in FIGS. 6(*b*) and 6(*e*), the spacer 50 is disposed on an end face of the motor case 27 so that the magnet body 20 is disposed within the through hole 51 of the spacer 50 (first operation).

Next, as shown in FIGS. 6(*c*) and 6(*e*), a cylindrical tube part 61 of a jig 60 is inserted between an inner wall of the through hole 51 of the spacer 50 and the outer peripheral face of the magnet body 20 and alignment of the spacer 50 with the magnet body 20 is performed by using the jig 60 (second operation).

Next, as shown in FIG. 6(*d*), the spacer 50 is fixed to the motor case 27 by using bolts 59 and, after that, the jig 60 is detached (third operation).

After that, the ring 15 of the circuit unit 30 which is assembled to a state shown in FIG. 3(*b*) is inserted into the through hole 51 of the spacer 50 and then, the case 33 of the circuit unit 30 is fixed to the spacer 50 by using bolts 39 (fourth operation). As a result, a magnetic type rotation detection device 10 has been assembled in a state that the ring 15 and the magnet body 20 are aligned with each other so that the center of the magnet body 20 is located on the center axial line of the ring 15.

(Principal Effects in this Embodiment)

As described above, in the magnetic type rotation detection device 10 in this embodiment, the ring 15 is fixed to the plate-like part 315 of the first case body 31 which is disposed as a partition member between the magnet body 20 and the magnetic sensing element 42, and the magnet body 20, the first case body 31 and the circuit board 40 are aligned with each other with the ring 15 as a reference. Further, the first case body 31 and the circuit board 40 is aligned with each other by positioning the magnetic sensing element 42 in the second recessed part 318r of the first case body 31. Therefore, positional accuracy between the magnetic sensing element 42 and the magnet body 20 is enhanced.

Further, two side portions adjacent to each other of the second recessed part 318r whose planar shape is quadrangular are abutted with the magnetic sensing element 42 and thus the magnetic sensing element 42 can be surely positioned in the second recessed part 318r in perpendicular two directions. In other words, in a case that the second recessed part 318r is provided with four inner peripheral side faces 318t, 318u, 318v and 318w, when the outer peripheral end part 420 of the protective layer 422 is to be abutted with the four inner peripheral side faces 318t, 318u, 318v and 318w, a high degree of dimensional accuracy is required between the second recessed part 318r and the protective layer 422. Therefore, in a case that a dimensional error has occurred, for example, the protective layer 422 may be disposed in the second recessed part 318r in an inclined state when a shape of the protective layer 422 is larger or, when the protective layer 422 is smaller, the protective layer 422 is unable to be positioned. However, in this embodiment, the outer peripheral end part 420 of the protective layer 422 is abutted with only two inner peripheral side faces 318t and 318u adjacent to each other. Therefore, even when a high degree of dimensional accuracy is not secured between the second recessed part 318r and the protective layer 422, positioning in an in-plane direction of the magnetic sensing element 42 can be performed.

Further, in this embodiment, even when the above-mentioned structure is adopted, a gap space is provided between the magnetic sensing element 42 and the bottom part 318s of the second recessed part 318r. Therefore, the magnetic sensing element 42 is disposed on the bottom part 318a of the recessed part 318 in a non-contact state and thus an unnecessary stress is not applied to the magnetic sensing element 42. Moreover, the magnetic sensing element 42 is provided with the protective layer 422, and the outer peripheral end part 420 of the protective layer 422 (outer peripheral end part 420 of the magnetic sensing element 42) is abutted with the inner peripheral side faces 318t and 318u of the recessed part 318. Therefore, even when the magnetic sensing element 42 is abutted with the recessed part 318, an unnecessary stress is not applied to the element main body 424.

The ring 15 is formed of magnetic material and thus the ring 15 functions as a magnetic shielding part for the magnet body 20. Further, the second case body 32 is also formed of magnetic material and thus the second case body 32 functions as a magnetic shielding part for the magnetic sensing element 42. Moreover, the second case body 32 is provided with the plate-like part 325 and the side plate parts 326 and thus roughly entire periphery of the magnetic sensing element 42 is magnetically shielded. Therefore, the inside of the case 33 is hardly affected by magnetic noises from the outside and thus, even when a special shielding member is not used, the semiconductor IC 46 and the magnetic sensing element 42 structuring the rotation detection circuit can be protected from magnetic noises. Especially, the magnetic sensing element 42 detects a rotational magnetic field generated from the magnet body 20. Therefore, when the magnetic sensing element 42 is magnetically shielded by the second case body 32, disturbance of the rotational magnetic field generated from the magnet body 20 is hard to be occurred and thus rotational magnetic field without disturbance can be detected by the magnetic sensing element 42.

Further, since the first case body 31 is nonmagnetic, even when the partition part of the first case body 31 (bottom part 318a of the recessed part 318) is disposed between the magnet body 20 and the magnetic sensing element 42, the first case body 31 does not obstruct magnetic lines of force directing from the magnet body 20 to the magnetic sensing element 42 and thus there is no hindrance in rotation detection. In addition, the second case body 32 is formed of magnetic material which is located on a side opposite to the magnet body 20 with respect to the magnetic sensing element 42. Therefore, the magnetic lines of force from the magnet body 20 can be efficiently guided to a side where the second case body 32 is located, in other words, a side where the magnetic sensing element 42 is located and thus detection sensitivity of the magnetic type rotation detection device 10 is improved.

Further, both of the first case body 31 and the second case body 32 are provided with electro-conductivity and thus the inside of the case 33 is electrically shielded. Therefore, the semiconductor IC 46 and the magnetic sensing element 42 are protected from an electric noise. Moreover, the second case body 32 is provided with the plate-like part 325 and the side plate part 326 and thus the roughly entire periphery of the semiconductor IC 46 and the magnetic sensing element 42 are electrically shielded. Therefore, a signal outputted from the magnetic sensing element 42 is hard to be affected by an electric noise. Further, the first case body 31 is provided with the partition part (bottom part 318a of the recessed part 318) which is disposed between the magnet body 20 and the magnetic sensing element 42 and thus the periphery of the semiconductor IC 46 and the magnetic sensing element 42 is electrically shielded completely. Therefore, since a signal outputted from the magnetic sensing element 42 is hard to be affected by an electric noise, a high degree of detection sensitivity is attained.

In addition, the second case body 32 is formed with the holes 325h which are in communication with the inside of the case 33. Therefore, even when the second case body 32 is not detached from the magnetic type rotation detection device 10, download of software and parameter inputting and parameter changing for offset adjustment or the like can be performed on the semiconductor IC 46 which is provided in the inside of the case 33 by means of that pin-shaped terminals are inserted through the holes of the second case body 32. Further, characteristic checking and adjustment for the magnetic type rotation detection device 10 can be performed in a state that the second case body 32 formed of magnetic material is attached and thus adjustment can be performed together with magnetic effect of the second case body 32.

Other Embodiments

In the embodiment described above, a rotation body is the rotation shaft 22 of the motor 2 and a stationary body is the motor case 27. However, the magnet body 20 is formed in a rotation body of other rotation mechanism and the circuit unit 30 may be mounted on a stationary body which supports the rotation body through the spacer 50. In this specification, the word "stationary" of the stationary body is used in a meaning opposite to the word "rotation" of the rotation shaft 22, and the word "stationary" includes a meaning that a stationary body is moved together with the rotation shaft 22. The stationary body may be a structure member other than the motor case 27, for example, a part of an apparatus on which the motor 2 is mounted.

In the embodiment described above, only one pair of "S"-pole and "N"-pole is formed in the permanent magnet 25 but the present invention may be applied to a case that plural pairs of "S"-pole and "N"-pole are formed.

In the embodiment described above, the positioning by utilizing the ring 15 is applied to a case that two case bodies are used. However, the positioning by utilizing the ring 15 may be applied to a structure in which the circuit board 40 on which the magnetic sensing element 42 is mounted is integrally molded with resin having small stress, for example, with BMC resin in which short glass fibers are kneaded in thermosetting resin having unsaturated polyester resin as a main component together with reinforcing agent, fillers and the like. In this case, a partition member is formed by a portion of the molding resin which covers the magnetic sensing element 42.

In the first and second embodiments, a gap space is secured between the magnetic sensing element 42 and the bottom part 318 of the recessed part 318 or the bottom part 318s of the second recessed part 318r. However, in a case that the protective layer of the magnetic sensing element 42 is disposed on a side of the bottom part of the recessed part like the second embodiment, the protective layer of the magnetic sensing element 42 may be abutted with the bottom part of the recessed part.

In the second embodiment, positioning is performed between the second recessed part 318r and the magnetic sensing element 42, both of which are formed in a quadrangular planar shape. However, in order that the second recessed part 318r and the magnetic sensing element 42 are abutted with each other to perform positioning, one or both of the second recessed part 318r and the magnetic sensing element 42 may be formed in a shape other than a quadrangular shape, for example, one is circular.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A magnetic type rotation detection device comprising:
   a magnet body which is formed with a magnetic pole pair comprised of an "S"-pole and an "N"-pole and which is provided on a rotation body;
   a magnetic sensing element which is disposed in a rotation center axial line direction of the rotation body so as to face the magnet body in the rotation center axial line direction;
   a partition member to which the magnetic sensing element is fixed, the partition member being disposed between the magnet body and the magnetic sensing element;
   a ring for positioning the magnetic sensing element and the magnet body, the ring being fixed to a face of the partition member on a side where the magnet body is located and is disposed in a non-contact state with the rotation body; and
   a spacer which is fixed to a stationary body of an apparatus on which the magnetic type rotation detection device is mounted, the spacer being utilized for positioning the ring;
   wherein a center of the magnetic sensing element is located on a center axial line of the ring, the magnet body is disposed on an inner side of the ring in a non-contact state with the ring, and a center of the magnet body is located on the center axial line of the ring; and
   wherein the spacer is provided with a through hole in which the magnet body is disposed on an inner side, and an inner diameter dimension of the through hole is same as an outer diameter dimension of the ring, and the ring is fitted into the through hole so that the ring is located between an inner wall of the through hole and an outer peripheral face of the magnet body;
   wherein the magnetic sensing element is disposed in a recessed part of the partition member which is recessed toward a side where the magnet body is located;
   the partition member is formed with an annular groove which surrounds the recessed part on a face where the magnet body is located; and
   an end part of the ring on a side where the magnetic sensing element is located is fitted into the annular groove.

2. The magnetic type rotation detection device according to claim 1, wherein the magnet body is formed with one pair of the "S"-pole and the "N"-pole.

3. The magnetic type rotation detection device according to claim 1, wherein
   the magnetic sensing element is mounted on a circuit board,
   the circuit board is disposed so as to overlap with a circuit board support part which is formed around the recessed part of the partition member, and
   a gap space is formed between the magnetic sensing element and the bottom part of the recessed part.

4. The magnetic type rotation detection device according to claim 1, wherein the magnetic sensing element is positioned by the recessed part so that an outer peripheral end part of the magnetic sensing element is abutted with an inner peripheral side face of the recessed part.

5. The magnetic type rotation detection device according to claim 4, wherein
   the magnetic sensing element is provided with a protective layer on its surface, and
   an outer peripheral end part of the protective layer is abutted with the inner peripheral side face of the recessed part.

6. The magnetic type rotation detection device according to claim 5, wherein
   the recessed part is provided with a bottom part and four inner peripheral side faces,
   two side parts of outer peripheral end parts of the protective layer which are adjacent to each other in a circumferential direction are abutted with two inner peripheral side faces adjacent to each other of the four inner peripheral side faces, and
   the magnetic sensing element is positioned by the two inner peripheral side faces of the recessed part.

7. The magnetic type rotation detection device according to claim 6, wherein
   the recessed part is provided with a first recessed part having a large diameter and a second recessed part which is recessed at a substantially center position of a bottom part of the first recessed part, and
   the outer peripheral end part of the protective layer is abutted with the inner peripheral side faces of the second recessed part so that the magnetic sensing element is positioned by the second recessed part.

8. The magnetic type rotation detection device according to claim 1, wherein the ring is a magnetic shielding member which is made of magnetic material.

9. A manufacturing method for a magnetic type rotation detection device having a magnet body which is formed with a magnetic pole pair comprised of an "S"-pole and an "N"-pole and which is provided on a rotation body, and a magnetic sensing element which faces the magnet body in a rotation center axial line direction of the rotation body, the manufacturing method comprising:
   fixing a ring on a face of a partition member on a side where the magnet body is located, the partition member being disposed between the magnet body and the magnetic sensing element;
   performing a first alignment step in which alignment of the ring with the magnetic sensing element is performed so that a center of the magnetic sensing element is located on a center axial line of the ring and then the magnetic sensing element is fixed to the partition member; and
   after the first alignment step, performing a second alignment step in which the ring and the magnet body are aligned with each other so that a center of the magnet body is located on the center axial line of the ring, wherein the second alignment step comprises:
   a first operation in which a spacer having a through hole provided with an inner diameter dimension that is same as an outer diameter dimension of the ring is disposed so that the magnet body is located in an inside of the through hole;
   a second operation in which a tube part of a jig is inserted between an inner wall of the through hole and an outer peripheral face of the magnet body to align the spacer with the magnet body through the jig;
   a third operation in which the spacer is fixed to a stationary body of an apparatus on which the magnetic type rotation detection device is mounted and then the jig is detached; and
   a fourth operation in which the ring is fitted into the through hole so that the ring is located between the inner wall of the through hole and the outer peripheral face of the magnet body.

10. The manufacturing method for a magnetic type rotation detection device according to claim 9, wherein previously providing a recessed part in the partition member, the recessed part being recessed toward a side where the magnet body is located and provided with an inner peripheral side face with which an outer peripheral end part of the magnetic sensing element is abutted, and in the first alignment step, when the magnetic sensing element is to be fixed to the partition member, the outer peripheral end part of the magnetic sensing element is abutted with the inner peripheral side face of the recessed part so that the magnetic sensing element is positioned.

11. The manufacturing method for a magnetic type rotation detection device according to claim 10, wherein a gap space is formed between the magnetic sensing element and a bottom part of the recessed part in a state that the magnetic sensing element is fixed to the partition member.

12. The manufacturing method for a magnetic type rotation detection device according to claim 10, wherein the magnetic sensing element is provided with a protective layer on its surface, and an outer peripheral end part of the protective layer is abutted with the inner peripheral side face of the recessed part.

13. The manufacturing method for a magnetic type rotation detection device according to claim 12, wherein the recessed part is provided with a bottom part and four inner peripheral side faces, two side parts of outer peripheral end parts of the protective layer which are adjacent to each other in a circumferential direction are abutted with two inner peripheral side faces adjacent to each other of the four inner peripheral side faces, and the magnetic sensing element is positioned by the two inner peripheral side faces of the recessed part.

14. The manufacturing method for a magnetic type rotation detection device according to claim 13, wherein the recessed part is provided with a first recessed part having a large diameter and a second recessed part which is recessed at a substantially center position of a bottom part of the first recessed part, and the outer peripheral end part of the protective layer is abutted with the inner peripheral side faces of the second recessed part so that the magnetic sensing element is positioned by the second recessed part.

* * * * *